United States Patent [19]

Fairley et al.

[11] 4,128,755

[45] Dec. 5, 1978

[54] APPARATUS FOR AUTOMATIC READING AND EVALUATION OF GRAPHS ON TRIP RECORDER DISKS, AND THE LIKE

[75] Inventors: John Fairley, Brigachtal; Josef Krickl, Bad Dürrheim; Robert Weber, Brigachtal, all of Fed. Rep. of Germany

[73] Assignee: Kienzle Apparate GmbH, Villingen-Schwenningen, Fed. Rep. of Germany

[21] Appl. No.: 761,181

[22] Filed: Jan. 21, 1977

[30] Foreign Application Priority Data

Jan. 23, 1976 [DE] Fed. Rep. of Germany ....... 2602461

[51] Int. Cl.[2] .......................... G06F 7/00; G06K 9/00; G05B 1/00

[52] U.S. Cl. ......................... 235/92 T; 340/146.3 AC; 250/556

[58] Field of Search .................... 235/61.6 A, 61.11 E, 235/92 T; 340/146.3 AC; 250/556

[56] References Cited

U.S. PATENT DOCUMENTS

| | | | |
|---|---|---|---|
| 3,718,808 | 2/1972 | Kelch et al. | 235/61.6 A |
| 3,829,660 | 8/1974 | Ruhl | 235/61.6 A |

*Primary Examiner*—Daryl W. Cook

*Attorney, Agent, or Firm*—Michael J. Striker

[57] ABSTRACT

The diagram carrier bears a plurality of graphs of different formats in different respective tracks. A scanning station includes a plurality of scanning elements arranged in a row. The diagram carrier is moved in the direction of its tracks and perpendicular to the row of scanning elements. In synchronism with the movement of the diagram carrier, the individual scanning elements of the row are read in succession, to determine which elements are graph-line-activated. A programmed storage subdivides the row of scanning elements into sectors corresponding to respective tracks. During each reading of the row of scanning elements the first and last activated scanning elements in each sector are distinguished from the other activated scanning elements in the same sector. During each reading of the row of scanning elements, the location-numbers of the first and last activated scanning elements in each scanning element sector and the total number of activated elements in each scanning sector are registered. Upon the completion of each single reading of the row of scanning elements, the location-numbers of the first and last activated elements of each sector and the total number of activated elements of each sector are transferred to a tabulating apparatus which produces a tabulated printout.

11 Claims, 3 Drawing Figures

APPARATUS FOR AUTOMATIC READING AND EVALUATION OF GRAPHS ON TRIP RECORDER DISKS, AND THE LIKE

BACKGROUND OF THE INVENTION

The invention relates to an apparatus for the automatic reading and evaluating of different types of diagram carriers. The diagram carriers of different types bear graphs of different respective formats. The diagram carrier is transported in the direction of the tracks for the graphs thereon and perpendicular to a row of scanning elements, each of the different graphs on the carrier being read by a different respective section of the row of scanning elements. The signals generated by the scanning elements are fed to electronic processing circuitry. The reading of the row of scanning elements proceeds in synchronism with the transport of the diagram carrier past the scanning elements at a rate coordinated with the time scale of the graphs, under the control of synchronizing signals.

Recorders which produce graphs with respect to time of various quantities to be monitored are known in a considerable variety of forms. The most familiar recorders are those which inscribe or otherwise record upon diagram disks and diagram strips. Particularly well known are trip recorders utilizing diagram disks for recording trip data for vehicles, especially locomotives, buses, trucks, and the like. The recorder records on such a diagram disk different graphs representing information relating to vehicle trips, for example information relating to travel speed, distance travelled, and the like. Bar graphs are often produced to represent information relating to which of two drivers has been operating the vehicle, the time intervals during which the vehicle has not been in operation, loading and unloading time periods, and so forth. Likewise, recorders are known which produce graphs indicative of the number of units of goods produced by machines, down-time intervals, setting-up time intervals of such machines, etc., these graphs usually being formed on different respective ones of a plurality of parallel tracks on the diagram carrier. With recorders utilized for applications in which the length of time during which the recorder is to operate is not known in advance, use is often made of diagram carrier strips, because in contrast to disks they are of unlimited length and can be torn off when operation of the recorder is no longer required. With diagram carrier strips, likewise, the graphs inscribed are usually graphs of quantitites or other phenomena plotted with respect to time.

With all the graphs produced by this variety of recorders, it is necessary at some point to evaluate the recorded graphical information. For many years, this was done mainly by visual means. Besides the inherent imprecision of visual evaluation and the considerable possiblity of misinterpretation, visual evaluation in general requires an unacceptably great amount of time. With today's large vehicle fleets, it is necessary to evaluate every day a very considerable number of such diagram carriers. It is accordingly necessary to find a way of evaluating these diagram carriers which requires less time than visual inspection and evaluation, and which is aas accurate as possible.

Various automatic readers and evaluators have already been developed for this purpose. In general, however, the known reading and evaluating apparatuses are each specially designed for a particular type of diagram carrier (for example disks) and/or for particular types of graphs (for example bar graphs, sawtooth graphs, etc.).

For example, Federal Republic of Germany patent DT-PS No. 1,499,399 discloses a reading and evaluating apparatus capable of evaluating bar graphs on a vehicle trip recorder disk. However, the apparatus is not capable of reading the graph on the trip recorder disk indicative of instantaneous vehicle speed plotted relative to time.

Federal Republic of Germany patent DT-PS No. 1,549,794 discloses an apparatus capable of reading the vehicle speed versus time graph on a vehicle trip recorder disk, but is not capable of reading and evaluating bar graphs.

Federal Rebublic of Germany patent DT-PS No. 1,921,456 discloses an automatic evaluating arrangement for the evaluation of diagram disks bearing graphs representing information relating to the operation of manufacturing machines, including operating time, the production of rejects, acceptable units, interruptions of production, and other variables. However, the evaluating apparatus is capable of evaluating only those graphs produced by a special recording apparatus. Evaluation of graphs of different formats, for example some of those produced by conventional vehicle trip recorders, is not possible with this apparatus.

Federal Rebublic of Germany patent DT-PS No. 2,104,351 discloses an apparatus for evaluating vehicle trip recorder diagram carriers bearing both bar graphs and distance-travelled graphs. However, the evaluation of graphs indicative of instantaneous vehicle speed plotted with respect to time, and other graphs of different format, cannot be performed. Additionally, this apparatus requires a very large number of photodiodes for scanning purposes.

SUMMARY OF THE INVENTION

It is a general object of the invention to provide a reading and evaluating apparatus of the type in question capable of properly reading and interpreting graphs of the greatest variety of possible formats, without the need for modifying the construction of the apparatus each time a graph of a radically different format is to be read and evaluated.

According to one advantageous concept of the invention, this object can be achieved by moving the diagram carrier in the direction of the graph tracks thereon and perpendicular to a row of scanning elements. The row of scanning elements are repeatedly read, each reading operation being constituted by reading the scanning elements in succession. A programmable program storage subdivides the row of scanning elements into sectors corresponding to the graph tracks on the diagram carrier. During each reading of the row of scanning elements, the reading apparatus distinguishes between the first graph-line-activated scanning element in each sector and subsequent activated elements and distinguishes between the last activated element in the sector and preceeding activated elements in the sector and furthermore determines for each sector the total number of activated scanning elements in the sector. During each reading of the row of scanning elements, the location-numbers of the first and last activated scanning elements in each sector, and also the total number of activated scanning elements in each sector, are registered. Upon the completion of each reading of the row of scanning elements, there is a transfer to a tabulating apparatus of the registered information representing the location-numbers of the first and last activated scanning elements in each sector and the total number of activated elements in each sector. The tabulating apparatus derives from these numerical values desired data and produces a tabulated print-out.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 3:
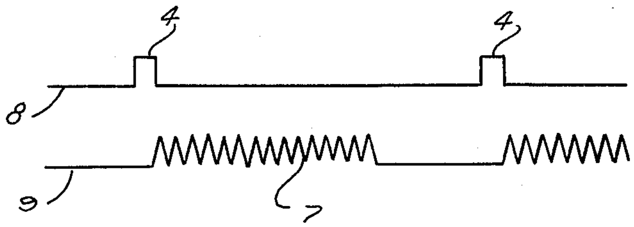
FIG. 3 depicts two pulse diagrams referred to in the explanation of the circuit of FIG. 2.

To explain the construction and operation of an automatic evaluating apparatus according to the invention, there is depicted in the drawing one adapted for the evaluation of circular diagram disks, particularly of the type inscribed by vehicle trip recorders. If a record strip, instead of a disk, is to be evaluated, it is merely necessary to correspondingly design the drive mechanism for the strip; the other illustrated components of the evaluating apparatus can be the same. Recording on the vehicle trip recorder diagram disk in diagrammatic form are a curve representing vehicle speed with respect to time, the travel and standstill time intervals for one driver, corresponding information for a second driver, a curve indicating distance travelled, and possibly also a curve indicating engine rpm. There may also be provided curves indicative of the operation of auxiliary apparatus, for example snow plows, sand spreaders, or the like, when the vehicle in question is provided with them.

Figure 1:
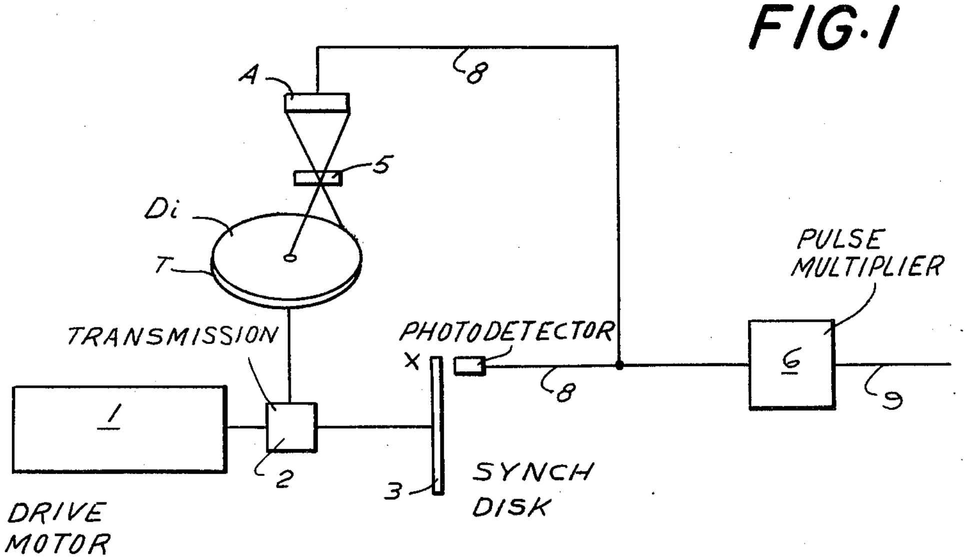
FIG. 1 schematically depicts an apparatus for the automatic reading of diagram disks.

In the schematic illustration of FIG. 1, there is depicted a turntable T onto which the diagram disk Di is securely clamped. The turntable T is rotatable and driven by a motor 1 through the intermediary of a speedreducing transmission 2. The motor additionally drives a synchronizer disk 3 which cooperates with optoelectronic means for the furnishing of synchronizing pulses 4. Above the diagram disk Di there is arranged a scanning station A provided with a plurality of scanning diodes Ak so disposed that a lens system 5 can project onto the photodiodes Ak a portion of the surface of diagram disk Di corresponding to an entire radius, i.e., to one half the diameter of the disk. With this arrangement, everthing inscribed in the region of one radius of a diagram disk Di is scanned by the scanning station A, and the totality of inscribed information on the disk will be scanned during the course of one rotation of the diagram disk Di. The number of scanning operations performed per disk rotation corresponds to the number of synchronizing pulses generated by synchronizer disk 3 during the rotation. In the example described here, the scanning elements in scanning station A are constituted by 256 diodes A*k* arranged in a row. This is done because diode arrays comprised of 256 or 512 diodes arranged in a row are at present readily available commercially. Between each two successive synchronizing pulses 4 generated by synchronizer disk 3, each of the scanning diodes Ak must be checked and read, to establish which diagrams are present along that radius of the diagram disk Di being scanned. For this reason, there is associated with synchronizer disk 3 a pulse multiplier 6 which generates, intermediate each two successive synchronizing pulses 4, a number of counting pulses 7 corresponding to the number of photodiodes A*k* utilized for scanning, this series of counting pulses being followed by a pause lasting until the next synchronizing pulse 4 and of duration sufficient for the transmission of the values read (FIG. 3). In the example described here, where 256 photodiodes Ak are provided, the pulse multiplier 6 generates five hundred pulses 7 for each synchronizing pulse 4. 256 of these five hundred pulses are used for counting along the row of photodiodes Ak from 1 to 256, and the remainder, the 257th through the 500th pulse, are utilized to effect transmission of information representing the state and number of the activated scanning diodes Ak to a storage, which is described in detail below.

To be able to evaluate the greatest possible variety of diagram disks Di, the rows of diodes Ak are subdivided into different sectors, the different sectors being associated with respective ones of the graphs on the diagram disk, with the subdivision into sectors being different for the different types of diagram disks to be evaluated. A programmable program storage B (FIG. 3) is provided for establishing the different sectors for the type of disk to be evaluated, in a manner described in greater detail below.

Figure 2:
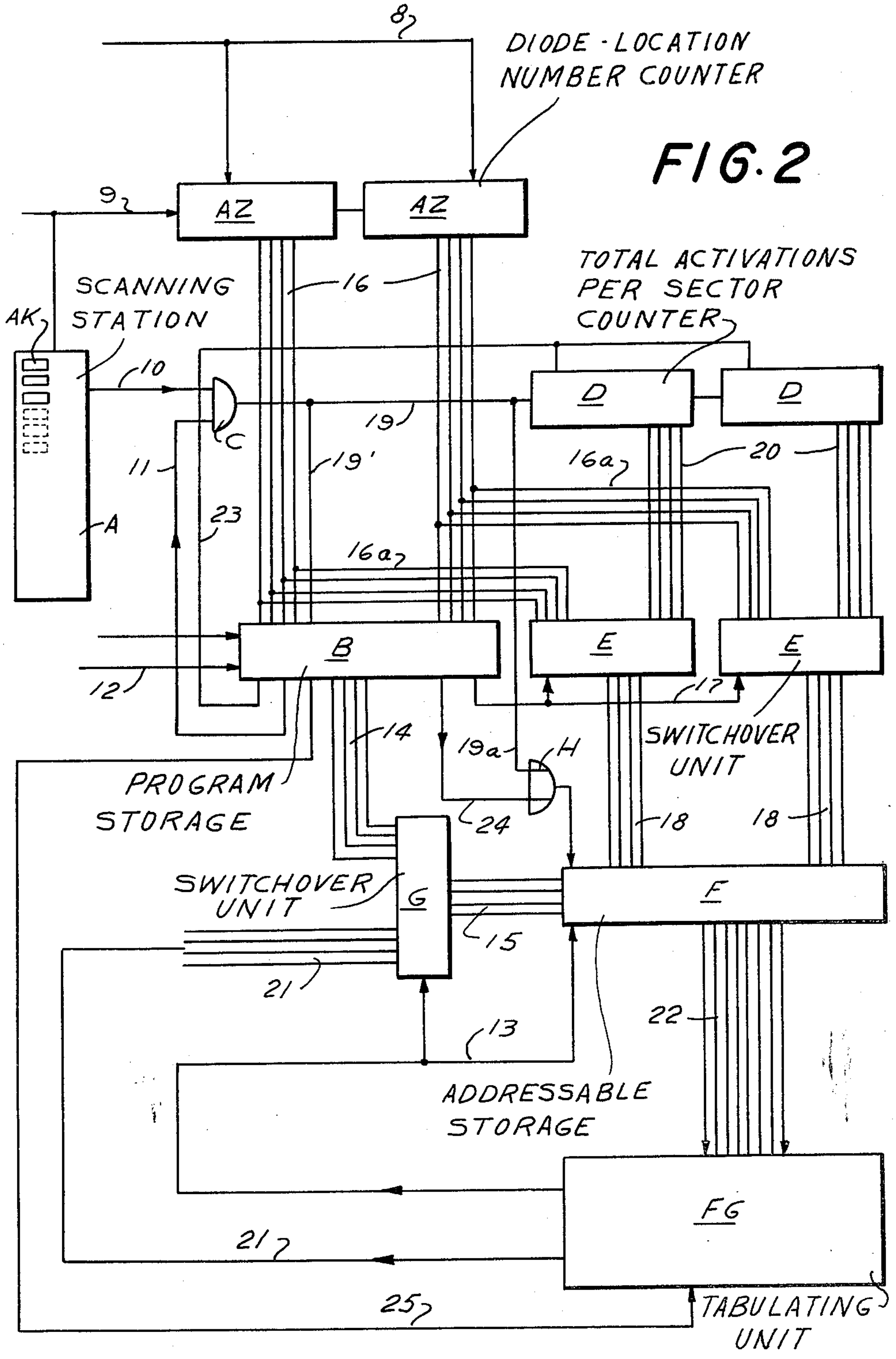
FIG. 2 depicts a circuit utilized for evaluating the diagram disks.

To make the explanation of the reading of the disk as easily understandable as possible, it will be assumed that the disk is a one-way disk upon which are recorded merely the driving time intervals for two drivers and the distance travelled. Inscribed on disk Di are graphs of these variables with respect to time extending over a span corresponding to twenty-four hours, i.e., one day. To effect reading of the disk Di, 7,200 synchronizing pulses 4 are generated by means of synchronizer disk 3 per 360° rotation of the disk Di. Each of these synchroniing pulses 4 causes the pulse multiplier 6 to generate 500 pulses, by means of which the 256 diodes A*k* are each checked once with respect to their state (FIG. 3). The pulses 4 are transmitted via a line 8 to a reading counter AZ (FIG. 2). The leading flank of each pulse 4 sets counter AZ to zero. The trailing flank of each pulse 4 starts the pulse multipler 6, causing the aforementioned 500 pulses to be applied to a line 9. These pulses 7 on line 9 are transmitted to both the counter AZ and also the scanning station A with its 256 diodes A*k*. The count on counter AZ at any time indicates the location-number of the diode associated with the diode output signal present at that time on line 10; these diode output signals, being either light-dark or dark-light signals, are fed to an AND-gate C. Memory B is preprogrammed with information concerning which diodes Ak are to be read and which not. Memory B stores a plurality of such programs, and the program to be used is selected by applying a program-selection signal to the program-selection inputs 12 of the program memory B. For the sake of explanation, it will be assumed that, according to the program which has been selected, first the 10th to 70th of the diodes Ak are to be read, then the 100th to 120th, and finally the 180th to 205th.

Program memory B has eight inputs, connected to the eight outputs of a counter AZ. The count on counter AZ at any given time indicates the location-number of that one of the diodes currently being read and thus provides program memory B with information indicating how far the reading operation has proceeded. Program memory B controls the entire reading operation.

As explained below, when the counter AZ has been advanced by the pulse series 7 up to the 10th diode, memory B furnishes a signal via a line 11 to the AND-circuit C. The counter AZ is advanced by the pulses 7, and it will be assumed that the 40th and 41st diods Ak have detected a mark on the diagram disk Di. Consequently, each of diodes 40 and 41 furnishes a respective signal on line 10; because a signal is simultaneously present on line 11, the diode output signals are transmitted through AND-circuit C.

Counter AZ is a binary counter capable of counting from "0" to "256".

Via line 9, the 256 diodes Ak of scanning station A are successively read to determine their respective states. In FIG. 2, counter AZ is, in particular, comprised of two 4-bit counters connected together by an overflow line. The count on counter AZ at any particular time indicates the location-number of that one of diodes Ak which is currently being read. When the diode Ak currently being read is detecting a graph line on the diagram disk, the output signal of the graph-line-activated diode is transmitted via output line 10 of scanning station A through AND-gate C, if the latter is enabled. The enablement of AND-gate C is determined by the selected program stored in program memory B. Program memory B enables AND-gate C for transmission of activated-diode output signals from graph-line-activated diodes only when the diode location-number indicated by counter AZ is one of the location numbers of the diode sectors established by the selected reading program.

Counter D is an eight-bit counter made up of two 4-bit counters interconnected by means of an overflow line. The counting signal input of counter D is connected to the output of AND-gate C. The purpose of counter D is to keep a count of the total number of diodes, within one diode sector, which have been activated by graph lines during the reading of the diodes of that sector. Counter D has reset inputs which receive reset signals from program memory B via a line 23. After the last diode of the first diode sector (consisting here of the 10th through 70th diodes) has been read, the count on counter D indicates the total number of activated diodes within that sector. This information is then transmitted to other components in the circuit, in a manner described below. After such transmission of the total number of activated diodes in the sector, memory B applies via line 23 a reset signal which resets counter D to zero, in preparation for counting the total number of activated diodes within the next sector (consisting here on the 100th through 120th diodes).

The circuit of FIG. 2 additionally includes a sixteen-input eight-output switchover stage E, here made up of two eight-input four-output components stages in correspondence to the design of counters AZ and D. Switchover stage E has a control input 17 via which it receives switchover signals from program memory B. Switchover stage E has two states; in one, it transmits to its eight outputs 18 the diode location-number present on outputs 16 of counter AZ, via eight branch-off lines 16*a;* in its other state, switchover stage E transmits to its eight outputs 18 the count present on the eight outputs 20 of counter D. The eight outputs of switchover stage E are connected to the eight inputs of a write-read memory F.

Write-read memory F consists of 256 one-bit storage units. These are organized into sixteen eight-bit storage regions, each capable of storing one eight-bit number. These sixteen storage regions are individually addressable by means of respective address signals "01" to "16" applied to the four address-signal inputs 15 of memory F. Depending upon which of the possible address signals "01" to "16" is applied to inputs 15, the eight-bit number applied to the inputs of memory F will be registered by the associated one of the sixteen eight-bit storage regions of memory F.

Memory F has a control input connected to the output of an OR-gate H. Memory F does not register the eight-bit number applied to its inputs except when a "1" signal is being applied from the output of H to the control input of memory F. These "1" signals are furnished via OR-gate H from program memory B via line 24, and also via AND-gate output line 19.

Memory F also has eight outputs 22, which are connected to the inputs of a tabulating apparatus FG, and a write-read mode-selection input which receives control signals from apparatus FG via line 13, to set the memory F for the writing in of eight-bit numbers or alternatively for the reading out of the eight-bit numbers already registered by memory F.

The four address-signal inputs 15 of memory F are connected to the four outputs of another switchover stage G. Switchover stage G has two states, controlled by the signal applied to its control input by unit FG, via control line 13. In one of its states, switchover stage G applies to address-signal inputs 15 address signals furnished from program memory B via address-signal lines 14; in the other of its tates, switchover stage G applies to address-signal inputs 15 address signals furnished from unit FG via address-signal lines 21. The address signals for memory F are furnished by program memory B during the writing into memory F, and are furnished by unit FG during the reading-out of memory F.

Program memory B has a control output 25 connected to a control input of tabulating unit FG, for commanding the tabulating unit FG to take over the addressing of memory F when the writing-in of information into F has been finished, and the reading-out of that information is to commence.

The apparatus depicted in FIG. 2 operates as follows:

To repeat, in the example being described, the 256 diodes Ak of scanning station A are to be subdivided into three sectors, respectively consisting of the 10th through 70th diodes, the 100th through 120th diodes, and the 180th to 205th diodes.

At the start of the reading and evaluation of the diagram disk Di, tabulating unit FG furnishes via line 13 a signal to memory F setting the latter into its write mode, so that it can receive fresh information; also tabulating unit FG furnishes via line 13 a signal to switchover stage G, setting the latter into the state thereof in which the outputs of stage G transmit address signals from the address-signal lines 14, not the address-signal lines 21. Also, program memory B applies to the switchover stage E via control line 17 a control signal setting stage E for transmission to its outputs of the signals on branch-off lines 16*a*, not the signals on counter outputs 20. Finally, program memory B applies, via lines 14 and 15, the "01" address signal to memory F, thereby readying the first of the sixteen eight-bit storage regions in memory F for receipt of information.

These preliminary settings having been established, the actual reading is ready to start. The first synchronizing pulse 4 is applied via line 8 to counter AZ. The leading flank of pulse 4 resets counter AZ to zero. The pulse 4 is also applied to pulse multiplier 6 (FIG. 1), and the trailing flank of pulse 4 causes pulse multiplier 6 to commence the generation of the 500 counting pulses 7.

These counting pulses are applied via line 9 to scanning station A and to counter AZ. In response to the first counting pulse, the 1st diode in the 256 diodes A*k* at station A is read. If the 1st diode is being activated by a graph line located therebeneath, a "1" signal appears on output 10 of scanning station A; otherwise a "0" signal appears on output 10. The output signal for the 1st diode Ak is applied via output line 10 to AND-gate C. However, the diode output signal of the 1st diode Ak is not transmitted through AND-gate C to the remainder of the circuit. This is because the first counting pulse 7 mentioned above has meanwhile been applied to counter AZ, which accordingly registers the count 00000001, representing the location-number of the 1st diode. This location-number is applied by counter AZ to program memory B. Because the selected reading program in memory B does not include the 1st diode A*k* among the three diode sectors to be read, memory B does not apply an enabling signal to the lower input of AND-gate C. Thus, the output signal from the 1st diode A*k*, if it is a "1" signal, is blocked by AND-gate C, and is not transmitted to the remainder of the circuit.

Next, the second counting pulse 7 is applied to scanning station A and to counter AZ. The count on counter AZ goes up by one, informing program memory B of the location-number of the 2nd diode A*k*. The 2nd diode A*k*, likewise, does not belong to any of the three diode sectors established for the reading of the type of disk D*i* in question. Accordingly, the diode output signal on line 10 for the 2nd diode, if a "1" signal, is likewise blocked by AND-gate C, and not transmitted to the remainder of the circuit.

The same thing occurs for the 3rd through 9th counting pulses 7. The 3rd through 9th diodes Ak do not belong to any of the three diode sectors established for the reading of disk Di, and so that output signals are not transmitted by AND-gate C to the remainder of the circuit.

It is to be recalled that the first diode sector consists of the 10th through 70th diodes A*k*. Accordingly, when the 10th counting pulse 7 is applied to scanning station A and counter AZ, program memory B is informed by counter AZ of the reaching of the 10th diode, and memory B applies via line 11 an enabling signal to AND-gate C. As a result, the output signal on line 10 for the 10th diode Ak can be transmitted through AND-gate C to lines 19 and 19*a*.

This will likewise be true of the diode output signals for the 11th through 70th diodes Ak, since these all belong to the first diode sector.

Let it be assumed that, of the 10th through 70th diodes, only the 40th and 41st diodes are being activated by graph lines to produce "1" diode output signals.

Thus, when the 40th counting pulse 7 is applied to scanning station A and diode location-number counter AZ, a diode output signal "1" will appear at the output of AND-gate C. This "1" signal is applied to counter D, whose count then changes from 00000000 to 00000001; counter D, as indicated above, is provided to count the total number of graph-line-activated diodes in each sector. Also, the "1" signal from the 40th diode is applied, via lines 19 and 19*a* and OR-gate H, to the control input of memory F. This causes memory F to register the eight-bit location-number of the 40th diode. It will be appreciated that, prior to reaching the 40th diode A*k*, each of the successive diode location-numbers at the outputs of counter AZ has been applied to the inputs of memory F, via branch-off lines 16*a* and switchover stage E. However, not until the first "1" signal on line 19*a* appears, is the control signal furnished by OR-gate H, for causing memory F to register a diode location-number. The location-number of the 40th diode, the first activated diode in the first diode sector, is registered in the first of the sixteen eight-bit storage regions of memory F; this is because, as indicated already, program memory B has been furnishing to memory F the "01" address signal via lines 14, switchover stage G, and lines 15.

To review what has occurred so far: Memory F, in the "01" storage location thereof, has now registered the eight-bit location number of the 40th diode, the first activated diode in the sector, and counter D has reached a count of 00000001, indicating that, so far, a total of one diode in the sector has been found to be activated by a graph line.

Program memory B, having now detected, via line 19', the first "1" signal from the diode sector in question, now applies to memory F the address signal "02", to ready the second eight-bit storage region of memory F for the registration of the next eight-bit diode location-number.

The reading of successive diodes proceeds. Specifically, now the 41st counting pulse 7 is applied. As indicated above, it is assumed that the 40th and 41st diodes Ak are the only ones in the first diode sector which are actually being graph-line activated.

Accordingly, a "1" signal from the 41st diode Ak is transmitted via 10, C and 19 to counter D, which now advances to count 00000010, indicating that, so far the total number of activated diodes in the sector is two. The "1" signal from the 41st diode Ak is also transmitted via lines 19, 19' and OR-gate H to the control input of memory F. As a result, memory F registers the location-number of the 41st diode in the second eight-bit storage unit thereof, because program memory B is furnishing counter F with address signal "02". The "1" signal from the 41st diode A*k* is also transmitted to program memory B, via line 19'. Thus, program memory B is informed that a second "1" signal has been encountered during the reading of the diode sector. However, program memory B does not respond by changing the address signal which it applies to memory F from "02" to "03"; instead, it continues to apply address signal "02". This is in contrast to what has been explained before. Before, when program memory B, via line 19', detected the first "1" signal in the diode sector, it changed the address signal from memory F from "01" to "02". Such change of address signal occurs only in response to detection by memory B of the first "1" signal in the sector, not subsequent "1" signals.

To summarize what has occurred so far: Memory F has now registered, in the first eight-bit storage region thereof (addressed by signal "01" on lines 15), the location-number of the first diode in the sector to produce a "1" signal. Memory F has now registered, in the second eight-bit storage region thereof (addressed by signal "02" on lines 15), the location-number of the second diode in the sector to produce a "1" signal.

The reading of the diodes of the first sector continues:

The 42nd through 69th counting pulses 7 are applied to scanning station A and to diode location-number counter AZ. However, as indicated above, only the 40th and 41st diodes are assumed to be graph-line-activated. Accordingly, the 42nd through 69th diodes produce only "0" signals. Therefore, the count on counter D, indicative of the total number of graph-line-activated diodes in the sector, does not go up. Likewise, no "1" signals are furnished via lines 19, 19*a* and OR-gate H to memory F, and so memory F continues to register, in the second storage region thereof, the location-number of the 41st diode.

When the 70th counting pulse (the last for the first diode sector) is generated, counter AZ informs program memory B that the end of the first diode sector has been reached. In response, memory B ceases to apply a "1" signal to AND-gate C, thereby disabling the latter. Also, memory B, applies via line 17, a switchover signal, setting switchover stage E for transmission of the count on counter D to memory F; as a result, the count on counter D is applied to the inputs of F. Next, the memory B changes the address signal which it applies to memory F from "02" to "03", to ready the third storage region in F for information receipt. Then, program memory B furnishes via line 24 a control signal to memory F, causing the latter to register the count from counter D in the third ("03") storage region of memory F.

Thus, the "01" storage region in F registers the location-number of the first diode in the first sector to actually produce a "1" signal; the "02" storage region in F registers the location-number of the last (and here the second) diode in the first sector to produce a "1" signal; and the "03" storage region in F registers an eight-bit number indicating the total number (two) of diodes in the first sector which have actually generated "1" signals.

This having been done, program memory B first removes the control signal from line 24, and then resets counter D to zero via reset line 23, and the reading operation continues.

The 71st through 99th counting pulses 7 advance the location-number counter AZ, but have no other effect upon the circuit, because the 71st through 99th diodes do not form part of any of the three diode sectors established for the particular diagram disk Di. During this time, AND-gate C is not enabled by program memory B, so that if any "1" signals should happen to appear on line 10, these are not transmitted to the remainder of the circuit.

When the 100th counting pulse 7 is generated, counter AZ informs program memory B, via lines 16, that the 100th diode is now being read. This is the first diode in the second diode sector, constituted by the 100th through 120th diodes. Memory B now applies to memory F the address signal "04", readying the fourth eight-bit storage region in memory F for receipt of information. Also, program memory B enables AND-gate C for the transmission of diode-output "1" signals. Furthermore, when memory B recognizes that the first diode in the second sector has been reached, it applies a control signal to line 17, to switchover stage E for transmission to memory F of diode location-numbers from counter AZ.

The reading of the diodes in the second sector (the 100th through 120th diodes) now proceeds.

It will be assumed that, of the diodes in the second sector, the 110th through 120th diodes all are graph-line-activated and produce "1" signals, whereas none of the others in the sector do.

Accordingly, the 100th through 109th counting pulses 7 advance the location-nummber counter AZ correspondly, but have no other effect upon the circuit.

When the 110th counting pulse 7 is produced, the following occurs. The "1" signal appearing at the output of AND-gate C is transmitted via lines 19, 19*a* and OR-gate H to the control input of memory F; as a result, memory F registers, in the fourth ("04") storage region thereof the location-number of the 110th diode, the first diode in the second sector to produce a "1" signal. Also, this first "1" signal of the second sector is transmitted via line 19' to program memory B, which recognizes this "1" signal as the first such signal in the sector. In response to such recognition, memory B changes the address signal on lines 15 from "04" to "05". As a result, the location-number for the 110th diode is also stored in the fifth ("05") storage region of memory F.

Also, the "1" signal from the 110th diode is applied to counter D, whose count changes from 00000000 to 00000001, indicating that the total number of "1" signals produced so far is one.

The counting proceeds.

The next counting pulse, the 111th, causes the 111th diode Ak to be read. As indicated before, the 110th through 120th diodes are all assumed to be graph-line-activated and to produce "1" signals. Accordingly, the "1" signal from the 111th diode is fed, via 19, 19*a* and H to memory F. This causes memory F, which has just registered the location-number of the 110th diode in its fifth ("05") storage region, to now register the location-number of the 111th diode in that same storage region; i.e., the location-number of the 111th diode replaces that of the 110th diode in the fifth ("05") storage region of memory F.

In response to this second "1" signal, program memory B does not change the address signal from "05" to "06"; the address signal remains at value "05".

The counting proceeds.

The 112th counting pulse 7 is generated. The 112th diode A*k*, which is graph-line-activated, furnishes a "1" signal, via C, 19, 19*a* and H, to the control input of memory F. Accordingly, now, the location-number of the 112th diode replaces that of the 111th diode in the fifth ("05") storage region of F.

Also, the "1" signal from the 112th diode is applied to counter D.

The counting proceeds.

In response to the 113th through 120th counting pulses, the 113th through 120th diodes, all graph-line-activated, apply "1" signals to the control input of memory F; as a result, the location number of each of these diodes successively replaces that of the preceding diode in the fifth ("05") storage region of memory F.

Also, these "1" signals are applied to counter D.

Thus, after the 120th diode (the last in the sector) has been read, the situation is as follows: The fourth ("04") storage region in memory F stores the location-number of the first diode in the sector to have produced a "1" signal, whereas the fifth ("05") storage region in memory F stores the location-number of the last diode in the sector to have produced a "1" signal. As it happens, the last diode in the sector to have produced a "1" signal happens also to be the last diode in the sector.

In response to the generation of the 120th counting pulse, program memory B does the following: First, it disables the AND-gate C, but only after a brief time delay long enough not to interfere with the registration by storage region "05" in F of the location-number of the 120th diode. Next, memory B changes the address signal for memory F from "05" to "06". Next, memory B applies a switchover signal to line 17, setting switchover stage E for transmission to memory F of the count on counter D. Next, program memory B applies a control signal to line 24, to cause the sixth ("06") storage region of F to register the count on counter D. Next, program memory B ceases to apply the control signal to line 24, and then resets counter D via line 23.

Thus the "04" storage region of F registers the location-number of the first diode in the second sector to produce a "1" signal; the "05" storage region registers the location-number of the last diode in the second sector to produce a "1" signal; and the "06" storage region registers the total number of diodes in the second sector which have produced "1" signals.

The counting proceeds further.

The 121st through 179th counting pulses 7 are generated, and cause the diode location-number counter AZ to advance correspondingly. However, the 121st through 179th diodes A*k* do not form part of any of the three sectors defined above; therefore, during these counting pulses, program memory B does not enable AND-gate C, and so these counting pulses have no other effect upon the circuit.

The 180th counting pulse is then generated, causing corresponding advancement of location-number counter AZ. Because the 180th diode Ak is the first diode in the third sector (consisting of the 180th through 205th diodes), program memory B applies a "1" signal to AND-gate C, enabling the latter for transmission of diode-output "1" signals. Also, program memory B applies a signal to line 17, to reset switchover stage E for transmission to F of the location-number from counter outputs 16, 16*a*. Additionally, program memory B changes the address signal on lines 15 from "06" to "07".

It will be assumed that of the diodes in the third sector (180th through 205th), the 190th through 201st diodes are all activated, but not any of the others.

Thus, the 180th through 189th diodes produce no "1" signals on line 19, and the only effect upon the circuit is the advancement of counter AZ by the 180th through 189th counting pulses.

The 190th counting pulse is generated.

As a result, 190th diode A*k* produces a "1" signal at the output of OR-gate H, and the "07" storage region of memory F registers the location-number of that diode. Also, the diode-output "1" signal on line 19' is detected by program memory B, which recognizes that signal as the first "1" signal produced during the reading of the third sector. In response to such detection, memory B changes the address signal on lines 15 from "07" to "08". As a result the location-number of the first activated diode (the 190th) is additionally registered in storage region "08" of F; if the 190th diode were not only the first, but also the last activated diode in the sector, then the registration by regions "07" and "08" of one and the same location-number would of course be proper. Also, the "1" signal from the 190th diode is applied to counter D, which thereupon advances from count 00000000 to count 00000001, indicating that so far the total number of activated diodes in the sector is one.

Next, the 191st through 201st counting pulses 7 are generated. Counter AZ advances correspondingly. The diodes corresponding to these pulse all produce "1" signals. Accordingly, the location-numbers of these successive activated diodes are successively registered in the "08" storage region of F, each location-number replacing the preceding one in storage region "08". During this time, the address signal "08" furnished to F by B, via lines 14, 15, remains at value "08". Thus, after the 201st counting pulse, storage region "08" of F will register the location-number of the 201st diode.

Next, the 202nd through 204th counting pulses are generated. These advance counter AZ correspondingly. However, the 202nd through 204th diodes have been assumed not to be graph-line-activated. Therefore, no diode-output "1" signals are fed to counter D or to the OR-gate H; accordingly, the count on counter D does not advance, and the "08" region in memory F continues to register the location-number of the last activated diode in the sector.

Next, the 205th counting pulse is generated, advancing counter AZ correspondingly. Memory B recognizes the count on counter AZ as indicating the end of the third diode sector. In response to this detection, program memory B disables AND-gate C, switches stage E over to transmit the count from counter D to memory F, and then applies a control signal to line 24 to cause the "09" storage region of memory F to actually register the count on counter D. Thereupon, memory B ceases to apply a signal to control line 24, resets counter D to zero via reset line 23, and switches stage E back via line 17 to again couple branch-off lines 16*a* to lines 18. This time, i.e., at the end of the last sector, memory B does not need to change the address signal, because no more information will be registered by memory F.

The counting proceeds.

The 206th through 256th counting pulses are generated and advance counter AZ correspondingly. However, because the associated diodes are not part of a programmed sector, AND-gate C remains blocked, and these counting pulses have no other affect upon the circuit.

Upon reaching the 256th counting pulse, the counter AZ will have informed the program memory B that the last of the diodes has been read. In response, program memory B applies a command signal to tabulating unit FG via control line 25. In response, tabulating unit FG applies, via control line 13, a signal to switchover stage G causing the latter to couple address-signal inputs 15 to lines 21, and a signal to the mode control input of memory F, effecting a conversion from the write to the read mode thereof. Thereupon, tabulating unit FG applies successive address signals "01", "02", "03", etc., to the address-signal inputs of memory F, causing the corresponding eight-bit storage locations to be read-out successively, the registered eight-bit numbers being transmitted successively to the tabulating unit FG.

When the next synchronizing pulse 4 is generated and applied to line 8, its leading flank resets counter AZ to zero. The resetting of counter AZ is detected by program memory B, which in response issues a command signal on line 25 to tabulating unit FG. In response, unit FG applies control signals to line 13, resetting the memory F to the write mode thereof, and resetting the switchover stage for addressing of memory F by address-signal lines 14. The next reading operation is then performed, upon the next radially extending incremental sector of the rotating diagram disk D*i*.

When the diagram disk D*i* has performed a complete rotation, the reading operations cease to be performed, and a new diagram disk D*i* can be inserted for reading.

The information transmitted to the tabulating unit FG during the reading of the diagram disk is utilized by unit FG to print out tabulated values of interest to the user of the apparatus. The tabulations actually performed do not, per se, form part of the present invention. They may be quite simple, involving merely a translation into tabulated numerical form of the data on the diagram disk. Alternatively, however, the tabulating unit FG may perform more complicated, arithmetic operations, to yield tabulated numerical data not directly determinable from visual inspection of the diagram disk.

A characteristic feature of the reading system of FIG. 2 is that for each incremental segment of the rotating diagram disk, there are registered, for each track (i.e., for each diode sector) the location-numbers of the first and last graph-line activated diodes of the sector, and the total number of activated diodes in the sector. Alternatively, as a simpler possibility, it would be possible to register only the location-number of the first graph-line-activated diode in each sector, plus the total number of activated diodes in the sector.

In particular, the registration of the location-number of the first activated diode in each sector is of advantage when evaluating diagrams whose curves rise and fall, for example those produced by temperature recorders where the curves are exclusively rising and falling curves. Additionally, the inventive expedient makes it possible to properly read diagrams of the type which, when read by other reading systems, lead to the production of false information. For example, it may happen that a bar graph formed by an oscillating scribe, because of faulty operation or the travel of the vehicle provided with the recorder, does not properly consist of solid bars, but instead of sawtooth curves; conventional readers often detect such zig-zag curves as strokes, i.e., not for example as travel time but instead as a standstill or out-of-operation interval.

With the reading system of the present invention, the rising and falling segments of such a non-solid bar graph, because they are within the tolerances of the reader, is recognized as having the same breadth as a properly formed solid bar, and accordingly can be recognized as being for example, the travel diagram, and be properly interpreted. As another possibility, wave diagrams, for example values recorded by a power recorder in the form of curves, can be directly converted into digital form, depending upon the location-numbers of the graph-line-activated diodes in the respective diode sector. For example, in the case of a temperature recorder, the activation of the 10th diode can be directly associated with 5° C., and the activation of the 210th diode with 100° C.

Also the reading system of the present invention greatly increases the possibility of distinguishing between diagrams resulting from proper recorder operation and meaningless or erroneous markings. For example, it might happen that a scratch extends over the major portion of the surface of a diagram transverse to the different diagram tracks. Such a scratch may activate the reading diodes, but the manner in which the graphical information is converted into signals with the present system makes it possible to automatically disregard such markings and/or generate a signal indicative of the presence of improper markings. With the signals generated by the present reading system, it is not difficult to recognize such meaningless or erroneous markings for what they are, because they usually have rising and falling sections and extend beyond the limits of the diode sectors associated with the different diagrams on the diagram carrier. They will be detected immediately upon the commencement of reading of one of the diode sectors. In comparison to the properly formed diagrams, the signal sequence resulting from meaningless or erroneous markings falls outside the scope of the proper diagrams, can therefore be immediately recognized as a fault, and be correspondingly processed in the tabulating unit or automatically ignored.

Thus, the inventive expedient of registering the location-numbers of the first and last activated diodes in the diode sectors and the total number of activated diodes in the diode sectors, is of great importance for the reading of stroke diagrams having rising and falling segments, graphs whose structure and/or position may deviate markedly from proper-operation conditions, and for the detection and signalling of erroneous inscriptions or surface flaws on the diagram carrier surface. Additionally, the location-numbers registered can be readily utilized in, for example, a vehicle trip recorder for indicating that the recording is operating improperly and must be readjusted or repaired.

When the location-numbers of both the first and the last activated diode in a diode sector are registered, subtraction of one location-number from the other must yield a number corresponding to the registered total number of activated diodes in the sector; lack of such correspondence immediately indicates malfunction or the presence of meaningless or erroneous markings.

The registration of the total number of activated diodes in a sector makes possible detection of bar graphs of different respective breadths and makes possible distinguishing between them; holding or standstill time intervals can be recognized when indicated in the form of strokes. With the detection of the graph-line-activated diodes, it is possible to properly read curve diagrams, as well as change of vehicle drivers indicated by graph track changes, and in general curves of almost any form, whether comprised of steady, rising and/or falling segments.

Also, the diagram carrier could be provided with special markings, not to be converted into signals to be processed by the tabulating unit, but instead utilized for the control of other system functions, e.g., for activating and deactivating control switches, and so forth.

It will be understood that each of the elements described above, or two or more together, may also find a useful application in other types of circuits and constructions differing from the types described above.

While the invention has been illustrated and described as embodied in a system for reading vehicle trip recorder diagram disks, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An apparatus for reading and evaluating the diagrams on a diagram carrier bearing a plurality of graphs of different respective formats in different respective tracks, comprising, in combination, a scanning station including a plurality of scanning elements arranged in a row; drive means for moving the diagram carrier in the direction of the tracks thereon and perpendicular to the row of scanning elements; reading means operative repeatedly for reading the individual scanning elements of the row in succession, including programming and registering means operative for subdividing the row of scanning elements into sectors corresponding to respective tracks, operative during one reading of the row for distinguishing between the first graph-line-activated element in each sector and subsequent activated elements in the same sector and for determining for each sector the total number of activated elements in the sector, and operative during one reading of the row for registering for each sector the location-number of the first activated element in the sector and the total number of activated elements in the sector; tabulating means; and means operative upon the completion of the reading of the row for transferring from the programming and registering means to the tabulating means the registered information representing the location-numbers of the first activated element in each sector and the total number of activated elements in each sector.

2. The apparatus defined in claim 1, said programming and registering means comprising means operative during one reading of the row for distinguishing between the last activated element in each sector and preceding activated elements in the sector, and operative during one reading of the row for registering for each sector the location-number of the last activated element in the sector, and transferring means comprising means operative upon the completion of the reading of the row for transferring from the programming and registering means to the tabulating means the registered information representing the location-numbers of the last activated element in each sector.

3. The apparatus defined in claim 1, the reading means including synchronizing means coupled to the drive means for producing synchronizing pulses and means for effecting one reading of the row of scanning elements per synchronizing pulse, said transferring means comprising means operative for performing the transfer of information registered in response to one synchronizing pulse prior to the generation of the next synchronizing pulse.

4. The apparatus defined in claim 1, the programming and registering means comprising storage means storing a plurality of different reading programs each differently subdividing the row of scanning elements into sectors and including selecting means for selecting different ones of said reading programs in correspondence to the type of diagram carrier to be read.

5. The apparatus defined in claim 1, the diagram carrier being a circular disk having circular tracks for the respective ones of the different graphs thereon, the drive means comprising means for rotating the circular diagram carrier disk, the row of scanning elements extending radially across the tracks of the circular diagram carrier disk.

6. The apparatus defined in claim 1, the diagram carrier being a strip having longitudinally extending tracks for the respective ones of the different graphs thereon, the drive means comprising means for longitudinally transporting the diagram carrier strip past the scanning station.

7. The apparatus defined in claim 1, the tabulating means being operative when the repeatedly operating reading means has completed the reading of the entire diagram carrier for processing the information transferred to the tabulating means during the successive reading operations and producing a tabulated print-out.

8. The apparatus defined in claim 2, at least one graph on the diagram carrier being comprised of rising and falling segments.

9. The apparatus defined in claim 1, the tabulating means including means for coordinating scanning element location-numbers with unique respective numerical values and performing a digital print-out of such numerical values.

10. An apparatus for reading and evaluating the diagrams on a diagram carrier bearing a plurality of graphs of different respective formats in a plurality of tracks, comprising, in combination, drive means for moving the diagram carrier in the direction of the tracks thereon;

pulse-generating means synchronized to the drive means and operative for generating a series of pulses;

a scanning station comprising a plurality of scanning elements each having a location number and arranged in a row extending perpendicular to the direction in which the drive means moves the diagram carrier, the scanning station comprising means connected to receive the series of pulses and in response thereto reading out successive single ones of the scanning elements in succession, whereby the scanning station produces an output signal each time a graph-line-activated scanning element is read out, and including a location-number counter connected to receive said series of pulses and produce an ongoing count indicative of the location-number of the scanning element currently being read out;

a gate having an information input connected to the output of the scanning station for receiving the output signals of all graph-line-activated scanning elements, the gate also having an enablement input;

an addressable storage having an address input and an information input and containing a plurality of individually addressable storage regions;

a switchover unit having an output connected to the information input of the addressable storage and having first and second inputs and operative for transmitting information from either its first input or else its second input to its output, and thereby to the information input of the addressable storage, in dependence upon a received control signal, the first input of the switchover unit being connected to the output of the location-number counter;

a total-activations-per-sector counter having an input connected to the output of the gate and having an output connected to the second input of the switchover unit;

and a program storage storing a plurality of alternatively selectable programs for diagram carriers having graphs of different formats, the program storage having an information input connected to the output of the location-number counter, an enablement output connected to the enablement input of the gate, a control-signal output connected to apply control signals to the switchover unit, and an addressing output connected to the address input of the addressable storage for addressing storage regions, the program storage being operative for subdividing the row of scanning elements into predetermined sectors by applying an enablement signal to the gate only when the location-number counter indicates that predetermined scanning elements are being read out, the program storage furthermore being operative during the course of the read-out of the successive scanning elements of each individual sector for determining that, for the first time during the scanning of that sector, a graph-line activated element has been read out and in response to that determination causing the location-number on the location-number counter to be transmitted via the switchover unit to the addressable storage and be written into a predetermined storage region within the latter and then, at the end of the scanning of that sector, causing the count on the total-activations-per-sector counter to be transmitted via the switchover unit to the addressable storage and be written into a succeeding predetermined storage region within the latter, whereby, after the completion of one read-out of all scanning elements in all sectors, succeeding storage regions within the addressable storage store, for each sector, the location-number of the first graph-line-activated scanning element in that sector and also the total number of graph-line-activated scanning elements in that sector.

11. The apparatus defined in claim 10, the program storage being furthermore operative, after causing the addressable storage to store the location-number of the first graph-line-activated element in a sector, to then cause the addressable storage to store in a succeeding storage region the location-number of the last graph-line-activated element in the sector, and only thereafter causing the addressable storage to store the count on the total-activations-per-sector counter.

* * * * *